(12) United States Patent
Harris et al.

(10) Patent No.: US 12,130,484 B2
(45) Date of Patent: Oct. 29, 2024

(54) YIELD ENHANCEMENT TECHNIQUES FOR PHOTONIC COMMUNICATIONS PLATFORM

(71) Applicant: Lightmatter, Inc., Boston, MA (US)

(72) Inventors: Nicholas C. Harris, Boston, MA (US); Carl Ramey, Westborough, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 17/942,404

(22) Filed: Sep. 12, 2022

(65) Prior Publication Data

US 2023/0085268 A1 Mar. 16, 2023

Related U.S. Application Data

(60) Provisional application No. 63/243,459, filed on Sep. 13, 2021.

(51) Int. Cl.
G02B 6/42 (2006.01)

(52) U.S. Cl.
CPC ......... G02B 6/4274 (2013.01); G02B 6/4249 (2013.01); G02B 6/4286 (2013.01)

(58) Field of Classification Search
CPC ... G02B 6/4274; G02B 6/4249; G02B 6/4286
See application file for complete search history.

(56) References Cited

U.S. PATENT DOCUMENTS

| 6,202,165 B1 | 3/2001 | Pine |
| 6,477,285 B1 | 11/2002 | Shanley |

(Continued)

FOREIGN PATENT DOCUMENTS

| EP | 3 159 721 A1 | 4/2017 |
| JP | 2005-502127 A | 1/2005 |

(Continued)

OTHER PUBLICATIONS

International Search Report and Written Opinion mailed Jan. 26, 2023, in connection with International Application No. PCT/US2022/043209.

(Continued)

*Primary Examiner* — Sung H Pak
*Assistant Examiner* — Hoang Q Tran
(74) *Attorney, Agent, or Firm* — Wolf, Greenfield & Sacks, P.C.

(57) ABSTRACT

Described herein are techniques for yield enhancement in photonic communications platforms. A photonic communication platform may include a photonic substrate patterned with a plurality of photonic modules including at least first and second photonic modules, wherein the first and second photonic modules are copies of a common template photonic module. Yield enhancement may be accomplished using photonic redundancy and/or electronic redundancy. Photonic redundancy may involve redundant optical lanes provided in parallel to primary optical lanes. Electronic redundancy may involve use of additional electronic circuits or wires running in parallel to electronic circuits or wires. Defective circuits may be disabled to prevent negative impacts on other parts of the electronic system. This can be done by providing power-isolating switches that completely disable and isolate the defective circuits.

13 Claims, 15 Drawing Sheets

(56) References Cited

U.S. PATENT DOCUMENTS

| | | |
|---|---|---|
| 7,251,386 B1 | 7/2007 | Dickinson et al. |
| 7,894,699 B2 | 2/2011 | Beausoleil |
| 8,450,186 B2 | 5/2013 | Rong et al. |
| 9,671,572 B2 | 6/2017 | Decker et al. |
| 9,922,887 B2 | 3/2018 | Vermeulen et al. |
| 10,847,467 B2 | 11/2020 | Collins et al. |
| 11,036,002 B2 | 6/2021 | Harris et al. |
| 11,754,783 B2 | 9/2023 | Harris et al. |
| 11,860,413 B2 | 1/2024 | Harris et al. |
| 2004/0258408 A1 | 12/2004 | Ramaswami et al. |
| 2005/0224946 A1 | 10/2005 | Dutta |
| 2008/0044128 A1 | 2/2008 | Kish, Jr. et al. |
| 2008/0089640 A1 | 4/2008 | Beausoleil |
| 2011/0073989 A1 | 3/2011 | Rong et al. |
| 2011/0128790 A1 | 6/2011 | Sarin et al. |
| 2012/0149148 A1 | 6/2012 | Dallesasse et al. |
| 2012/0177381 A1 | 7/2012 | Dobbelaere et al. |
| 2012/0203695 A1 | 8/2012 | Morgan et al. |
| 2013/0051725 A1 | 2/2013 | Shinoda et al. |
| 2013/0071121 A1 | 3/2013 | Sharapov et al. |
| 2013/0156366 A1 | 6/2013 | Raj et al. |
| 2013/0209112 A1 | 8/2013 | Witzens |
| 2013/0243429 A1 | 9/2013 | Whelihan et al. |
| 2013/0292840 A1 | 11/2013 | Shoemaker et al. |
| 2013/0308893 A1 | 11/2013 | Zuffada et al. |
| 2014/0040698 A1 | 2/2014 | Loh et al. |
| 2014/0043050 A1 | 2/2014 | Stone et al. |
| 2014/0264400 A1 | 9/2014 | Lipson et al. |
| 2014/0294342 A1 | 10/2014 | Offrein et al. |
| 2014/0300008 A1 | 10/2014 | Duan et al. |
| 2014/0363124 A1 | 12/2014 | Pelley et al. |
| 2015/0381273 A1 | 12/2015 | Gloeckner et al. |
| 2016/0191188 A1 | 6/2016 | Butler |
| 2016/0216445 A1 | 7/2016 | Thacker et al. |
| 2017/0194309 A1 | 7/2017 | Evans et al. |
| 2019/0162901 A1 | 5/2019 | Yu et al. |
| 2020/0111720 A1 | 4/2020 | Wan et al. |
| 2020/0284981 A1* | 9/2020 | Harris ............... G02B 6/136 |
| 2021/0215897 A1 | 7/2021 | Epitaux et al. |
| 2021/0375829 A1 | 12/2021 | Or-Bach et al. |
| 2023/0114842 A1 | 4/2023 | Harris et al. |
| 2023/0114847 A1 | 4/2023 | Harris et al. |
| 2023/0308188 A1 | 9/2023 | Dorta-Quinones et al. |
| 2023/0314711 A1 | 10/2023 | Eslampour et al. |
| 2023/0314742 A1 | 10/2023 | Dorta-Quinones et al. |
| 2023/0358957 A1 | 11/2023 | Harris et al. |
| 2023/0388024 A1 | 11/2023 | Tymchenko et al. |
| 2023/0400632 A1 | 12/2023 | Harris et al. |
| 2023/0408764 A1 | 12/2023 | Harris et al. |

FOREIGN PATENT DOCUMENTS

| | | | |
|---|---|---|---|
| JP | | 2011-503760 A | 1/2011 |
| JP | | 2015-062027 A | 4/2015 |
| JP | | 2018-506072 A | 3/2018 |
| KR | 10-2010-0095515 A | | 8/2010 |
| TW | | 508834 B | 11/2002 |
| WO | WO 2011/143548 A2 | | 11/2011 |
| WO | WO 2016/008771 A1 | | 1/2016 |

OTHER PUBLICATIONS

International Search Report and Written Opinion dated July 6. 2020, in connection with International Application No. PCT/US2020/021209.

Invitation to Pay Additional Fees dated May 1, 2020, in connection with International Application No. PCT/US2020/021209.

International Search Report and Written Opinion dated Sep. 3, 2019, in connection with International Application No. PCT/US2019/029803.

Invitation to Pay Additional Fees dated Jun. 19, 2019, in connection with International Application No. PCT/US2019/029803.

Invitation To Pay Additional Fees dated Nov. 7, 2022, in connection with International Application No. PCT/US2022/043209.

Fujikata et al., LSI on-chip optical interconnection with Si nano-photonics. Extended Abstracts of the 2007 International Conference on Solid State Devices and Materials. 2007. pp 276-277.

Grigalunas, Tell Me—What Is Wafer Dicing? Eastern States Components, LLC. Sep. 26, 2017. 2 pages. URL:https://www.escomponents.com/blog/2017/9/26/tell-me-what-is-wafer-dic-ing [retrieved on Jul. 13, 2020].

Wada, Electronics and Photonics Convergence on Si CMOS Platform. Proceedings of SPIE. 2004;5357:16-24. DOI: 10.1117/12.533807.

International Search Report and Written Opinion mailed Nov. 29, 2023, in connection with International Application No. PCT/US23/65007.

Singapore Search Report and Written Opinion dated Dec. 1, 2023, in connection with Singapore Application No. 11202108868T.

Orcutt et al., Open foundry platform for high-performance electronic-photonic integration. Optics Express. May 21, 2012;20(11).11 Pages.

* cited by examiner

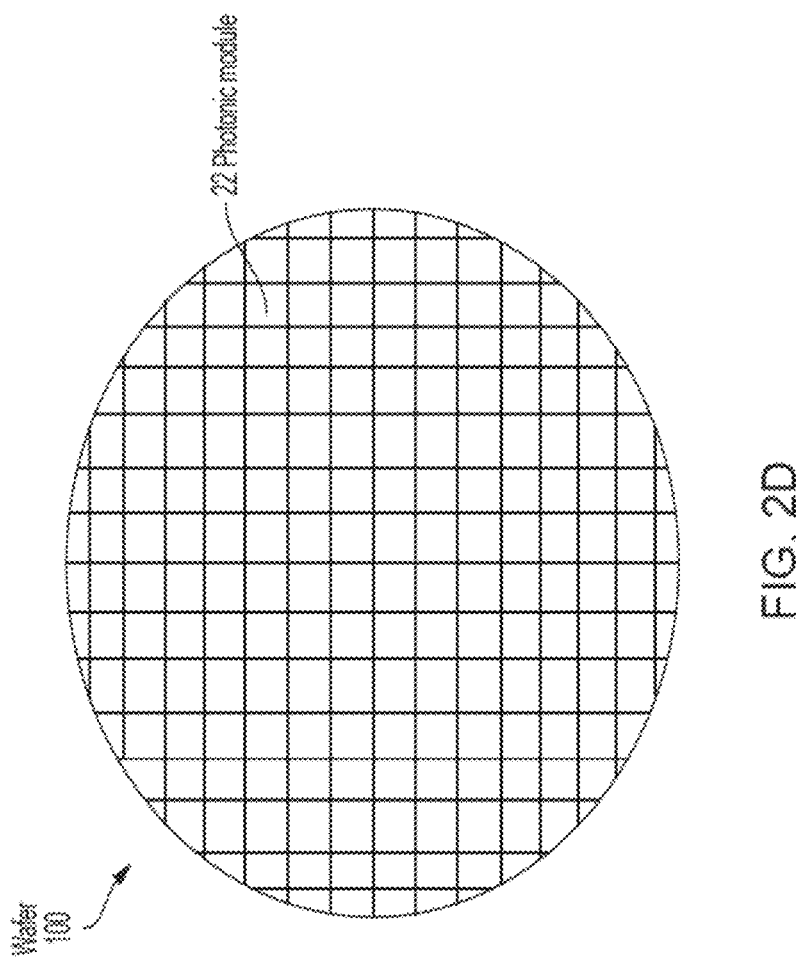

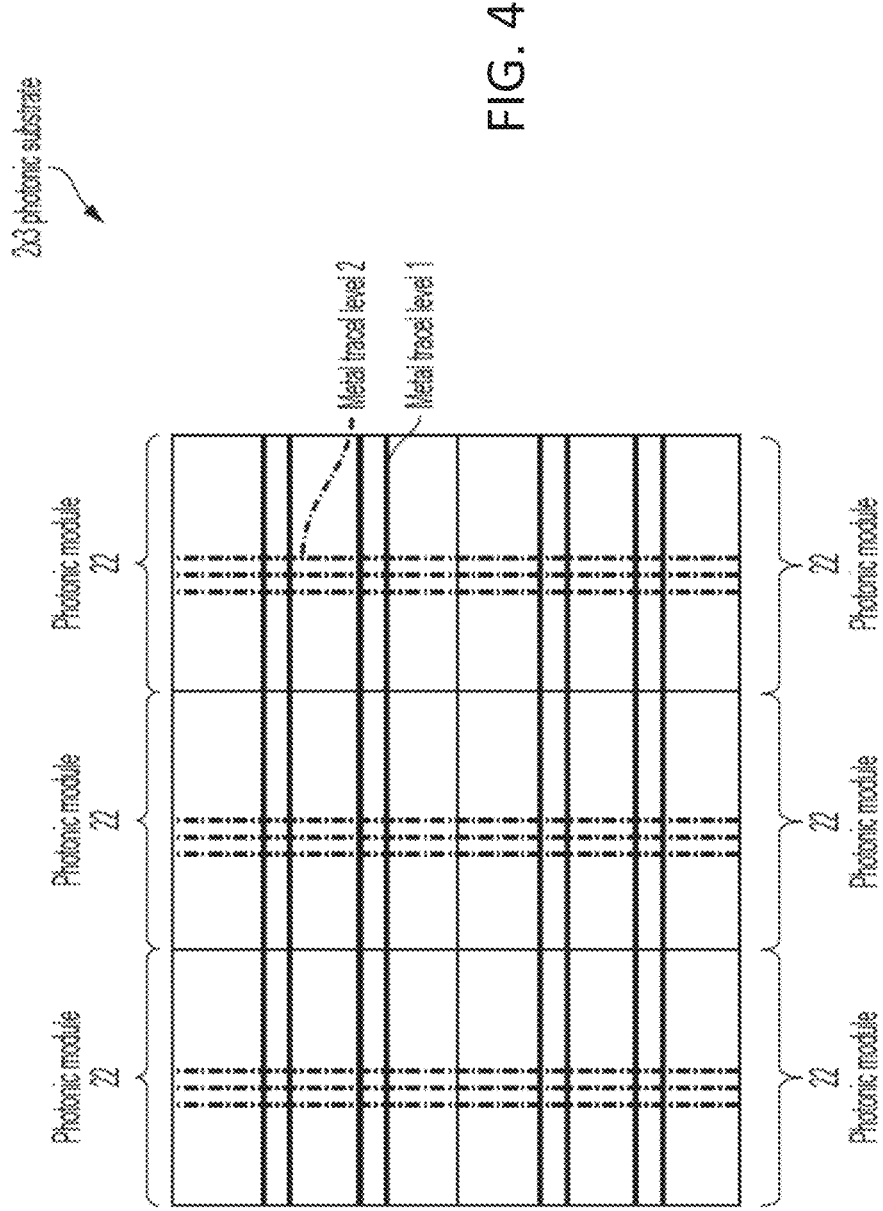

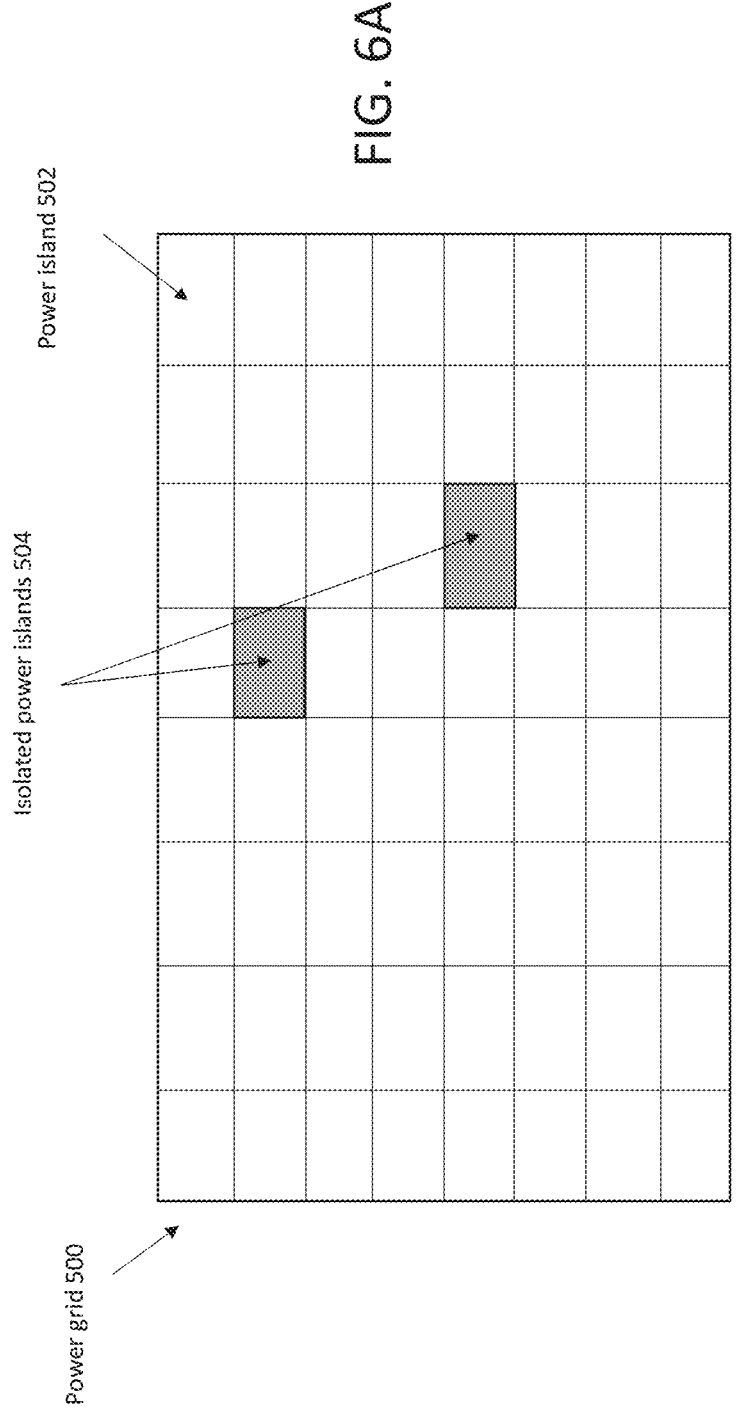

YIELD ENHANCEMENT TECHNIQUES FOR PHOTONIC COMMUNICATIONS PLATFORM

CROSS-REFERENCE TO RELATED APPLICATIONS

This application claims the benefit under 35 U.S.C. § 119(e) of U.S. Provisional Patent Application Ser. No. 63/243,459, entitled "YIELD ENHANCEMENT TECHNIQUES FOR PHOTONIC COMMUNICATIONS PLATFORM," filed on Sep. 13, 2021, which is hereby incorporated herein by reference in its entirety.

BACKGROUND

Computer systems include random-access memories (RAM) for storing data and machine code. RAMs are typically volatile memories, such that the stored information is lost when power is removed. In modern implementations, memories take the form of integrated circuits. Each integrated circuit includes several memory cells. To enable access to stored data and machine code, memories are place in electrical communication with processors. Typically, these electrical communications are implemented as metal traces formed on the substrates on which the memories and the processors are disposed.

SUMMARY OF THE DISCLOSURE

Some embodiments relate to a photonic system comprising: a photonic substrate patterned with a plurality of photonic modules including at least first and second photonic modules, wherein the first and second photonic modules are copies of a common template photonic module; a primary optical lane optically coupling the first photonic module to the second photonic module; and a redundant optical lane optically coupling the first photonic module to the second photonic module.

In some embodiments, the photonic system further comprises a first optical switch coupled to respective inputs of the primary optical lane and the redundant optical lane.

In some embodiments, the photonic system further comprises a second optical switch coupled to respective outputs of the primary optical lane and the redundant optical lane.

In some embodiments, the first optical switch is configured to irreversibly disconnect the primary optical lane or the redundant optical lane.

In some embodiments, the first and second photonic modules share a common optical waveguide layer pattern.

In some embodiments, the photonic system further comprises a first die in communication with the first photonic module, and a second die in communication with the second photonic module.

In some embodiments, the first die comprises a processor and the second die comprises a memory.

In some embodiments, the first die is stacked on top of the first photonic module and the second die is stacked on top or below the second photonic module.

In some embodiments, the photonic system further comprises a third die stacked on top of the first die.

Some embodiments relate to a method for fabricating a photonic system comprising: patterning a substrate with a plurality of photonic modules including at least first and second photonic modules using a stepper machine and a common photomask such that the first and second photonic modules share a common layer pattern. Patterning the substrate comprises defining a primary optical lane optically coupling the first photonic module to the second photonic module; and defining a redundant optical lane optically coupling the first photonic module to the second photonic module.

In some embodiments, patterning the substrate further comprises defining a first optical switch coupled to respective inputs of the primary optical lane and the redundant optical lane.

In some embodiments, patterning the substrate further comprises defining a second optical switch coupled to respective outputs of the primary optical lane and the redundant optical lane.

In some embodiments, the first optical switch is configured to irreversibly disconnect the primary optical lane or the redundant optical lane.

In some embodiments, the common photomask is a photonic layer photomask such that the first and second photonic modules share a common optical waveguide layer pattern.

In some embodiments, the method further comprises bonding a first die to the first photonic module, and bonding a second die to the second photonic module.

Some embodiments relate to a method for operating a photonic system comprising: obtaining a photonic substrate patterned with a plurality of photonic modules including at least first and second photonic modules, wherein both the first and second photonic modules are patterned according to a common photomask such that the first and second photonic modules share a common layer pattern; determining whether a primary optical lane optically couples the first photonic module to the second photonic module; and if it is determined that the primary optical lane does not optically couple the first photonic module to the second photonic module, optically coupling the first photonic module to the second photonic module using a redundant optical lane.

In some embodiments, optically coupling the first photonic module to the second photonic module using the redundant optical lane comprises switching a first optical switch coupled to respective inputs of the primary optical lane and the redundant optical lane to select the redundant optical lane.

In some embodiments, optically coupling the first photonic module to the second photonic module using the redundant optical lane further comprises switching a second optical switch coupled to respective outputs of the primary optical lane and the redundant optical lane to select the redundant optical lane.

In some embodiments, switching the first optical switch to select the redundant optical lane comprises irreversibly disconnecting the primary optical lane from the first photonic module.

In some embodiments, the common photomask is a photonic layer photomask such that the first and second photonic modules share a common optical waveguide layer pattern.

Some embodiments relate to a photonic system comprising a photonic substrate patterned with a plurality of photonic modules including at least first and second photonic modules, wherein the first and second photonic modules are copies of a common template photonic module; and a power grid integrated with the photonic substrate and configured to electrically power at least some of the plurality of photonic modules, the power grid being arranged in a plurality of power islands that can be electronically isolated from the power grid.

In some embodiments, the power grid comprises a first metal trace level of the photonic substrate and a second metal trace level of the photonic substrate.

In some embodiments, the photonic system further comprises a plurality of electronic switches configured to disconnect one or more power islands from the power grid.

In some embodiments, the photonic system further comprises a primary wiring electrically coupling the first photonic module to the second photonic module, and a redundant wiring electrically coupling the first photonic module to the second photonic module.

In some embodiments, the photonic system further comprises a primary optical lane optically coupling the first photonic module to the second photonic module, and a redundant optical lane optically coupling the first photonic module to the second photonic module.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIG. 2D illustrates the wafer of FIG. 2A patterned in accordance with the photomask set of FIG. 2B, in accordance with some embodiments.

FIG. 4 illustrates a group of photonic modules sharing the same pattern of metal traces, in accordance with some embodiments.

FIG. 6A illustrates a power grid for powering a photonic substrate, in accordance with some embodiments.

DETAILED DESCRIPTION

I. Overview

Figure 1:
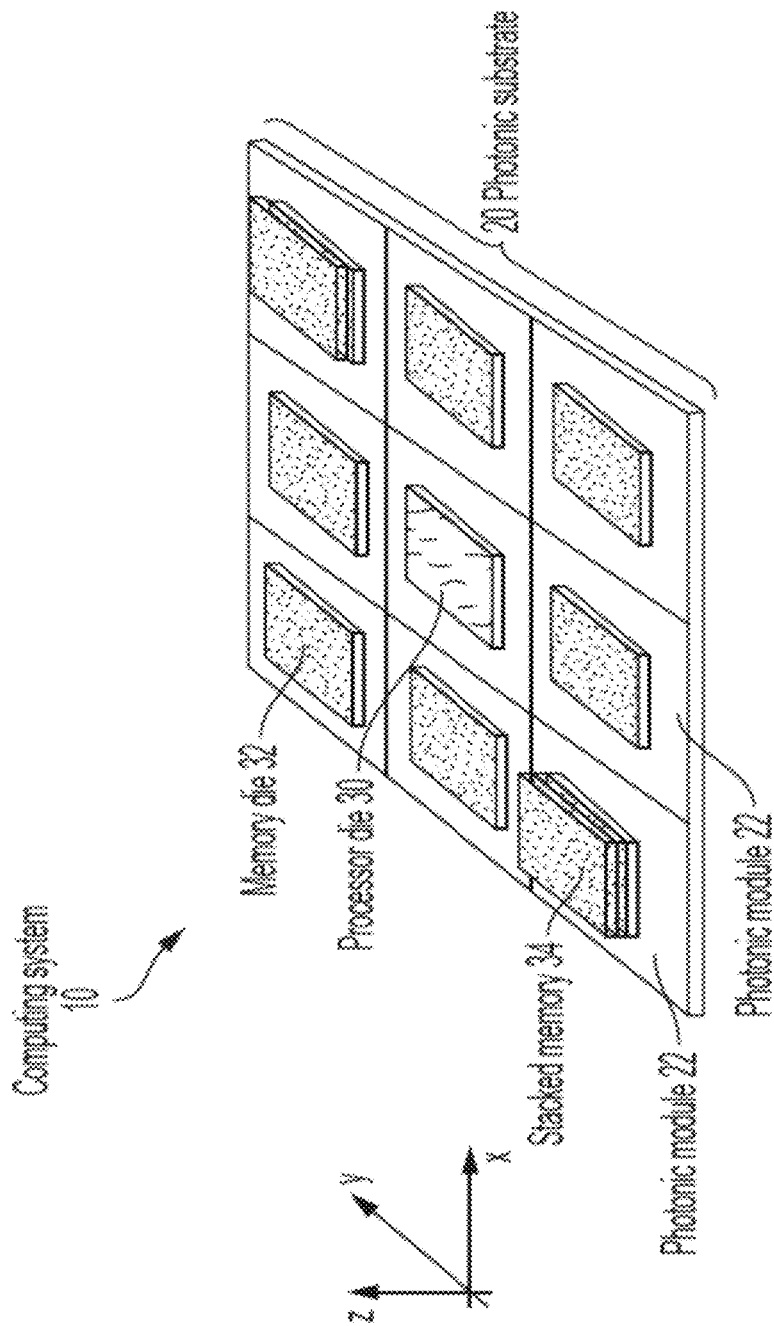
FIG. 1 illustrates a computing system based on a photonic communication platform, in accordance with some embodiments.

The inventors have recognized and appreciated that the finite yields associated with wafer-scale manufacturing processes negatively affect the scalability of photonic communication platforms. The yield associated with a manufacturing process represents the fraction of components that are not defective divided by the total number of manufactured components. The yield of a manufacturing process is generally less than 100%, and is attributable to a variety of factors, including for example equipment performance, system complexity and operator capability. Wafer-scale manufacturing processes tend to have lower yields than chip-scale manufacturing processes because of the substantially larger areas involved. The likelihood that a wafer is manufactured with a defect is the aggregate likelihood that each reticle of the wafer is manufactured with a defect. Photonic communication platforms of the types developed by the inventors are manufacturing using wafer-scale manufacturing processes, and, therefore, are negatively affected by the lower yields associated with these types of processes. Described herein are techniques for yield enhancement in photonic communication platforms.

The photonic communication platforms developed by the inventors and described herein include wafer-scale photonic integrated circuits that can enable computing systems with arbitrary architectures. Some embodiments provide photonic communication platforms that use photonic modules. Each photonic module includes programmable photonic circuits that can be configured based on the needs of a particular computer architecture. Some platforms are arranged according to 1-dimensional schemes, such as in blocks of 3×1 modules, in blocks of 5×1 modules, in blocks of 10×1 modules, 20×1 modules, etc. Some platforms are arranged according to 2-dimensional schemes, such as in blocks of 3×3 modules, in blocks of 5×3 modules, in blocks of 5×5 modules, in blocks of 10×10 modules, etc. More generally, the platforms enable any block of N×M modules, where N≥1 and M≥1, and any topology, such as T-topologies, L-topologies, X-topologies, etc. Each photonic module can serve as a node of a computing system. At each node, there may be a processing unit or a memory unit, for example.

The optical nature of these platforms enables computing architectures that would be impractical (if not unfeasible) using conventional electronic systems. Some modern applications, such as deep learning algorithms, require access to vast amounts of data, thus increasing the requirements for memory capacity. Further, some of these applications require access to data in real time or quasi real time, thus increasing the requirements for memory bandwidth. Some conventional computing systems utilize graphical processing units (GPUs) to improve memory access efficiency. Some GPUs transfer data from a memory at bandwidths as high as 256 GB/s or 512 GB/s. While such a memory bandwidth may be sufficient for most graphic-based applications, this is far from being enough for data-intensive applications such as deep neural networks and high-frequency trading. The presence of parasitic impedance is generally what limits the bandwidth scalability in conventional electronic systems. First, parasitic impedance limits the bandwidth that a trace can support. Second, it increases power consumption. To make things worse, parasitic impedance increases with the length of a trace, meaning that the larger the separation between a memory chip and a processor, the lower the bandwidth. This is why conventional computing systems are typically designed so that memory chips are positioned within a few centimeters of the processor. However, there are only so many memory chips that can be accommodated within this range. The result is that conventional computing systems are limited in both memory bandwidth and memory capacity.

The communication platforms developed by the inventors overcome these limitations using photonics. The physics according to which light propagates inside a waveguide makes optical communications inherently immune to parasitic impedance. The immunity to parasitic impedance leads to a major benefit—it removes the requirement that memory chips be positioned within a certain range of the processor.

Unfortunately, scaling these photonic communication platforms is challenging due to the relatively low yields associated with wafer-scale manufacturing processes. Some types of defects can impair the functionality of a photonic circuit. When light encounters one of these defects, partial or complete loss of optical power can result. Other types of defects can impair the functionality of an electronic circuit and/or wiring that is part of a photonic module (e.g., a modulator driver or a trans-impedance amplifier). When an electric signal encounters one of these defects, signal attenuation or complete loss can result.

In some embodiments, photonic redundancy may be introduced to reduce the negative effects of defects that impair the functionality of a photonic circuit. Photonic redundancy may involve use of additional optical lanes running in parallel to primary optical lanes. A lane can include various optical components, including for example waveguides, modulators, detectors, lasers, couplers, switches, etc. If a defect is detected during post-manufacturing test, these redundant components can be mapped into the system using dedicated optical switches. In some embodiments, it is also possible to implement an optical anti-fuse which acts as a switch that irreversibly disconnects an optical component and permits connection with another optical component.

In some embodiments, electronic redundancy may be introduced to reduce the negative effects of defects that impair the functionality of an electronic circuit of a photonic module. Electronic redundancy may involve use of additional electronic circuits or wires running in parallel to electronic circuits or wires. This approach provides a way to work around defective circuits or wires. In some embodiments, the defective circuits may be disabled to prevent negative impacts on other parts of the electronic system. This can be done by providing power-isolating switches that completely disable and isolate the defective circuits.

II. Photonic Communication Platforms

FIG. 1 illustrates an example computing system based on a photonic communication platform with nine photonic modules arranged in a 3×3 topology, in accordance with one example. Computing system 10 includes a photonic substrate 20 patterned with nine photonic modules 22 (also referred to herein as "photonic sites," or simply "sites"). This photonic communication platform supports one processor die (30) positioned in the middle of photonic substrate 20, and eight memory nodes surrounding the processor die. Some of the memory nodes include a single memory chip (see for example memory die 32). Other memory nodes include a stacked memory including multiple vertically-stacked memory dies (see for example stacked memory 34). The dies can communicate with the photonic module electronically (e.g., using through-silicon vias, copper pillars, micro-bumps, ball-grid arrays or other electrical interconnects) and/or optically (e.g., using grating couplers, prisms, lenses or other optical couplers).

As described in detail further below, the photonic modules may be patterned with optical waveguides and optical distribution networks. The optical distribution network of a photonic module can selectively place the die of that particular node in optical communication with any other die of the computing system. For example, the optical distribution network of the photonic module positioned under processor die 30 may be reconfigured depending on the needs of the processor. At the beginning of a routine, the processor may need to access data stored in a first memory node. This read operation involves configuring the respective optical distribution networks to place the processor in optical communication with the first memory node. Later in the routine, the processor may need to write data into a second memory node. This write operation involves reconfiguring the optical distribution networks to place the processor in optical communication with the second memory node.

Manufacturing photonic modules in large scales can be costly. The photonic communication platforms described herein are engineered in a way that limits manufacturing costs. These platforms rely on the use of common photomask sets to fabricate multiple photonic modules. This approach reduces costs in two ways. First, it reduces additional costs that would otherwise be incurred in procuring several different photomask sets. Second, it enables fabrication of photonic modules using standard semiconductor foundries, some of which require that the same photomask set (or at least one photomask) be used across an entire wafer. Designing photonic modules that share at least one photomask enables fabrication of many photonic modules on the same semiconductor wafer while leveraging standard, low-cost step-and-repeat manufacturing processes.

III. Photonic Modules

The photonic modules described herein may be manufactured using microfabrication techniques, including for example complementary metal-oxide-semiconductor (CMOS) microfabrication techniques. Accordingly, some embodiments relate to silicon photonics-based optical communication platforms. Some particular microfabrication techniques involve step-and-repeat approaches—whereby stepper machines are used to pattern a semiconductor wafer with multiple copies of a template layout (e.g., a reticle). FIG. 2A through FIG. 2E illustrate microfabrication techniques for manufacturing photonic modules. FIGS. 3A through 3F illustrate examples of photonic modules patterned using these microfabrication techniques.

Figure 2A:
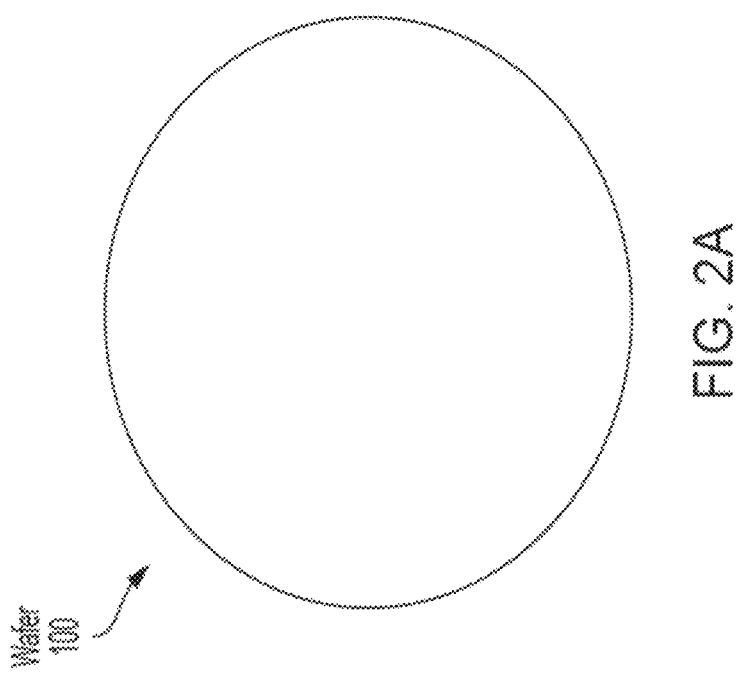
FIG. 2A illustrates a semiconductor wafer, in accordance with some embodiments.

Referring first to FIG. 2A, this figure illustrates a semiconductor wafer 100. Wafer 100 may be made of any material. For example, wafer 100 may be made of (or otherwise include) silicon. In one example, wafer 100 is a silicon-on-insulator (SOI) wafer. In another example, wafer 100 is a bulk silicon wafer. Wafer 100 may have any size. For example, the diameter of wafer 100 may be 150 mm, 300 nm, or 450 mm, among other possible values. However, not all wafers need to have a circular shape.

Figure 2B:
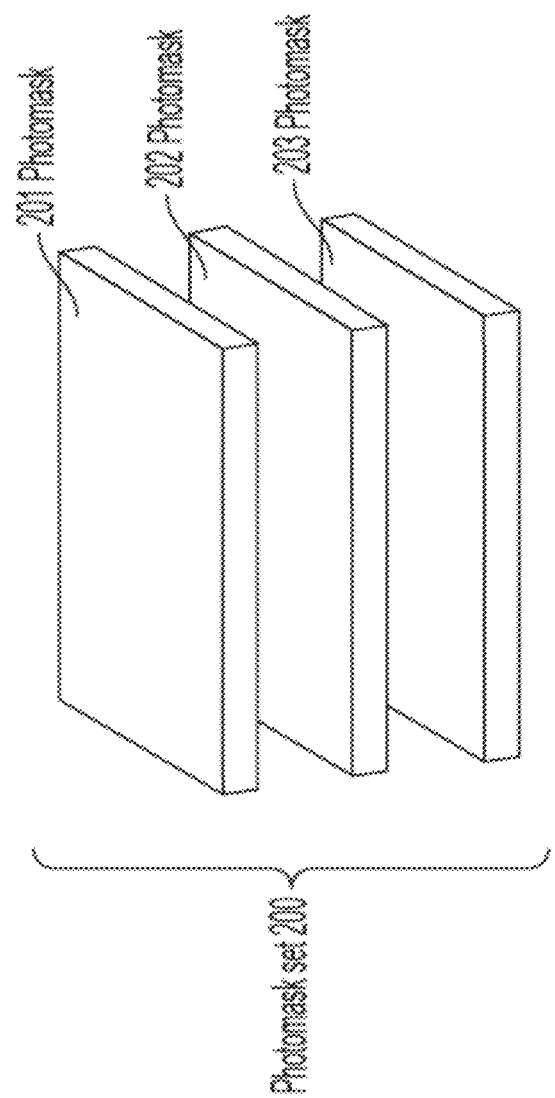
FIG. 2B illustrates a set of photomasks, in accordance with some embodiments.

FIG. 2B illustrates a set of photomasks that may be used for patterning wafer 100 using photolithographic techniques. Photomask set 200 includes three photomasks (201, 202 and 203), though other sets may include more or fewer photomasks. Each photomask has a particular pattern of opaque and transparent regions. When the photomask is exposed to light, the opaque regions block the light, thereby preventing it from shining a wafer, and the transparent regions allow passage of the light. The result is that the pattern of the photomask is transferred to the wafer.

Figure 2C:
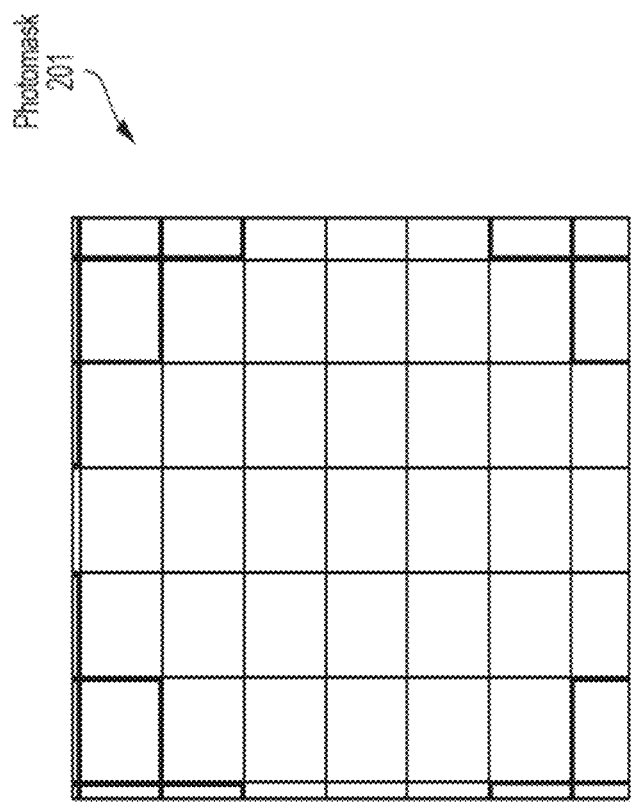
FIG. 2C illustrates an example photomask for forming optical waveguides, in accordance with some embodiments.
Figure 2E:
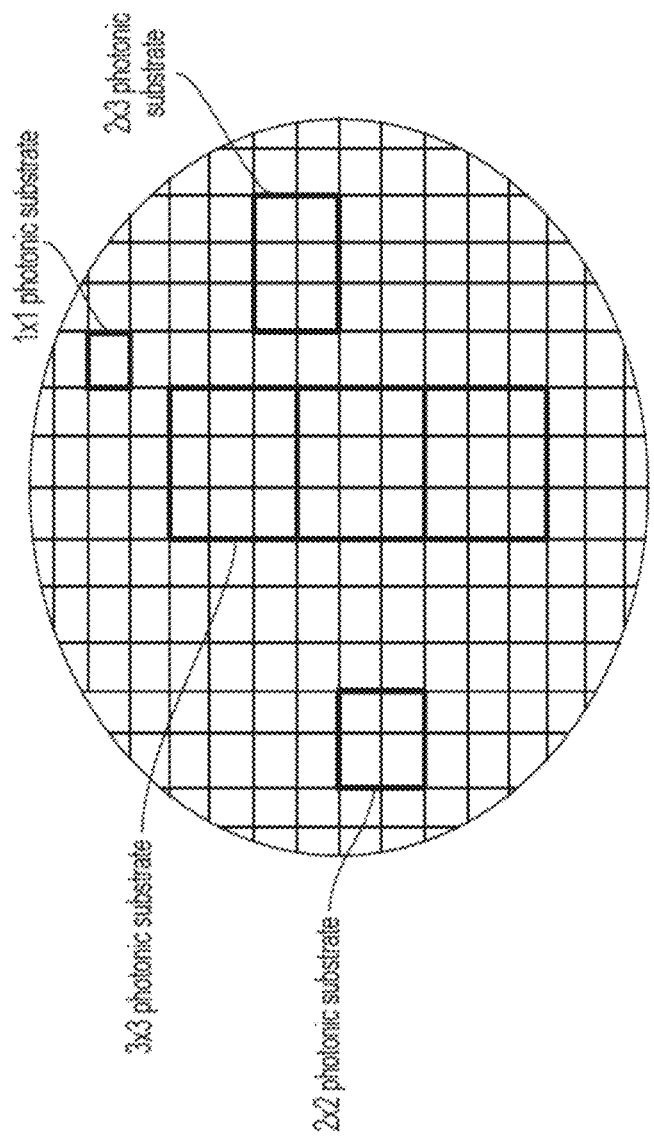
FIG. 2E identifies photonic substrates formed on the patterned wafer of FIG. 2D, in accordance with some embodiments.

Each photomask may define a particular layer of a photonic module. One photomask may be used to define optical waveguides. When the wafer goes through an etch process, only the exposed regions (or only the non-exposed regions) are etched away, while the other regions remain un-etched. This photomask may be patterned to form a network of optical waveguides when the wafer is exposed to light through this photomask. FIG. 2C illustrates a portion of a photomask that may be used to form waveguides on wafer 100. The lines of photomask 201 represent opaque regions. The background of photomask 201 is transparent. Exposure of photomask 201 to light so that an image of the photomask is projected onto wafer 100 enables patterning of waveguides in the shapes of the opaque regions. In this particular example, the pattern of lines of the photomask results in a grid of waveguides.

Some photonic modules involve use of different levels of optical waveguides. In some such embodiments, photomask set 200 may include a dedicated photomask for each waveguide level. Another photomask may be used to define n-doped regions. When the wafer goes through an ion implantation or dopant diffusion process, only the exposed regions (or only the non-exposed regions) receive the doping, while the other regions remain undoped. Another photomask may be used to define p-doped regions using a similar process. Some photonic modules involve use of different doping concentrations. In some such embodiments, photomask set 200 may include a dedicated photomask for each doping concentration. In other embodiments, photomask set 200 may include photomasks used to define deposition of semiconductor materials other than silicon, such as germanium and/or other materials of the periodic table, such as Groups III or V. Another photomask may be used to define metal contacts. Another photomask may be used to define metal traces. Some photonic modules involve use of different levels of metal traces. In some such embodiments, photomask set 200 may include a dedicated photomask for each metal trace level.

In some embodiments, wafer 100 is patterned in a step-and-repeat fashion. When wafer 100 is processed in a stepper machine, the pattern of a photomask is exposed repeatedly across the surface of the wafer, in a grid. This process involves moving the wafer in steps back and forth and left and right under the lens of the stepper, and exposing the photomask at each step. The result is that wafer 100 is patterned with multiple copies of the pattern defined by a photomask. This operation may be repeated for each photomask (or at least some photomasks) of the set.

In some embodiments, this process may be used to pattern wafer 100 with multiple copies of a template photonic module. In the example of FIG. 2D, wafer 100 has been patterned with a grid of photonic modules 22. The photonic modules may share the pattern of one or more photomasks of set 200. For example, the photonic modules may share the pattern of the same waveguide photomask(s) and/or the same m trace photomask(s). In other embodiments, the photonic modules share the pattern of all the photomasks of set 200. For example, the photonic modules may share the same optical waveguide pattern, the same n-doping pattern, the same p-doping pattern, the same contact pattern, the same metal trace pattern, etc.

In some embodiments, the entire surface of wafer 100 is patterned using photomask set 200. However, not all embodiments are limited in this respect as some portions of wafer 100 may be patterned using a first photomask set and other portions of wafer 100 may be patterned using a second photomask set. In some embodiments, the first and second photomask sets may share one or more common photomasks, such as a waveguide photomask.

Once patterned, wafer 100 may include multiple photonic substrates. Photonic modules 22 may be separated from the wafer together to form photonic substrates of any desired shape and size. For example, the wafer of FIG. 2E has been marked to obtain six photonic substrates from wafer 100. This figure identifies a 1×1 photonic substrate having only one photonic module 22, a 2×2 photonic substrate having four photonic modules 22, a 2×3 photonic substrate having six photonic modules 22, and three 3×3 photonic substrates having nine photonic modules 22 each. Separation of a photonic substrate from the wafer involves dicing the wafer along the perimeter of the desired photonic substrate. One of the 3×3 photonic substrates of wafer 100 may be used as the photonic substrate of the example computing system of FIG. 1 (see photonic substrate 20).

The techniques described in connection with FIGS. 2A-2D enable manufacturing of photonic modules at relatively low costs. Some semiconductor foundries require that the same photomask set (or at least one photomask) be used for patterning the entirety of a wafer (or at least a portion of a wafer). Otherwise, patterning different portions of a wafer using different photomasks would involve replacing one photomask for another between photolithographic exposures, which would make the step-and-repeat process inefficient and costly. Designing photonic modules that share at least one photomask enables fabrication of many photonic modules on the same semiconductor wafer while leveraging standard, low-cost step-and-repeat processes.

Figure 3A:
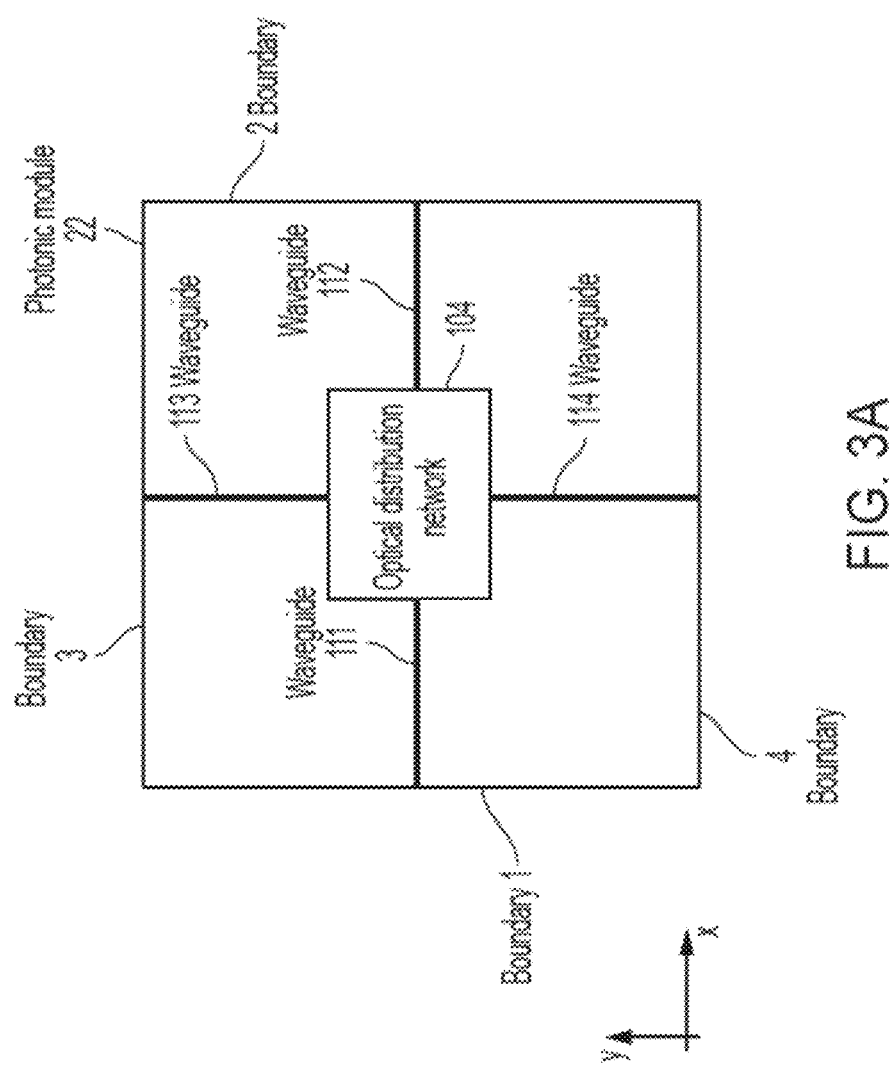
FIG. 3A illustrates an example photonic module of the patterned wafer of FIG. 2E, in accordance with some embodiments.

FIG. 3A illustrates an example photonic module 22. In this example, photonic module 22 is shaped as a rectangle (though other shapes are also possible, such as squares or other polygons). As such, photonic module 22 is bounded by four boundaries (boundaries 1, 2, 3 and 4). Boundary 1 is opposite to boundary 2, and boundary 3 is opposite to boundary 4. Boundary 1 is adjacent to boundaries 3 and 4, and boundary 2 is also adjacent to boundaries 3 and 4. Photonic module 22 includes an optical distribution network 104 coupled to waveguides 111, 112, 113 and 114. Waveguide 111 optically couples optical distribution network 104 to boundary 1. As such, optical signals coupled from optical distribution network 104 to waveguide 111 can be transferred outside the photonic module by crossing boundary 111. Similarly, waveguide 112 optically couples optical distribution network 104 to boundary 2, waveguide 113 optically couples optical distribution network 104 to boundary 3 and waveguide 114 optically couples optical distribution network 104 to boundary 4. In some embodiments, the boundaries of a photonic module are defined based on a photolithography shot (e.g., the boundaries are defined by the boundaries of the photomask(s) used to fabricate the photonic module). In other embodiments, however, one photolithography shot may define more than one photonic module. For example, a photomask may be patterned with multiple side-by-side instances of a template photonic module. In some such embodiments, the boundaries of a photonic module are defined where adjacent instances of the template photonic module meet.

While the example of FIG. 3A illustrates waveguides coupling the optical distribution network to each of the boundaries, not all embodiments are arranged in this manner. In other embodiments, a photonic module 22 may include two of these four waveguides, such as waveguides 111 and 112, or waveguides 111 and 113. In yet other embodiments, a photonic module 22 may include three of these four waveguides, such as waveguides 111, 112 and 113. Optical distribution network 104 includes photonics components (e.g., photonic switches) for routing optical signals inside and outside photonic module 22.

In some embodiments, a photonic module may include multiple layers of photonic waveguides. Similar to how multiple layers of conductive traces increase an electronic circuit's ability to route electric signals, multiple layers of waveguides increase a photonic module's ability to route optical signals. In one example, one layer includes silicon waveguides, and one layer includes silicon nitride waveguides. In another example, multiple layers include silicon waveguides. Additionally, or alternatively, multiple layers include silicon nitride waveguides. The choice of material of each waveguide layer may be determined by the wavelength of light that will be routed by the waveguide. For example, silicon and silicon nitride layers may be used for routing infrared light in the telecommunication bands with wavelengths around 1.3 μm or 1.5 μm. In some examples, the multiple layers of waveguides may also include aluminum nitride waveguides that can be used to route visible light down to UV wavelengths or aluminum oxide waveguides that are used to route UV light. Each layer may be arranged in a configuration similar to that illustrated in FIG. 3A—with an optical distribution network that routes signals among the waveguides of the layer.

Photonic module 22 may further include one or more out-of-plane couplers (not shown in FIG. 3A). An out-of-plane coupler may be configured to emit light outside the xy-plane, for example in a direction parallel to the z-axis or at an angle relative to the z-axis. An out-of-plane coupler may be further configured to capture light shining from outside the xy-plane. In some embodiments, an out-of-plane coupler enables optical communication between photonic module 22 and a die disposed above the photonic module and/or below the photonic module. An out-of-plane coupler may be implemented using any suitable optical component, including for example optical gratings, lenses, and prisms. In some embodiments, the optical distribution network may be configured so that the same out-of-plane coupler enables optical communication in both directions—from optical distribution network 104 to a die and from the die to optical distribution network 104.

Optical distribution network 104 may selectively couple any components of photonic module 22 to any other components of photonic module 22. For example, optical distribution network 104 may enable passage of light between waveguide 111 and waveguide 112, and/or between waveguide 111 and waveguide 113, and/or between waveguide 113 and waveguide 114, etc. This may be achieved by equipping the optical distribution network with controllable optical switches.

Figure 3B:
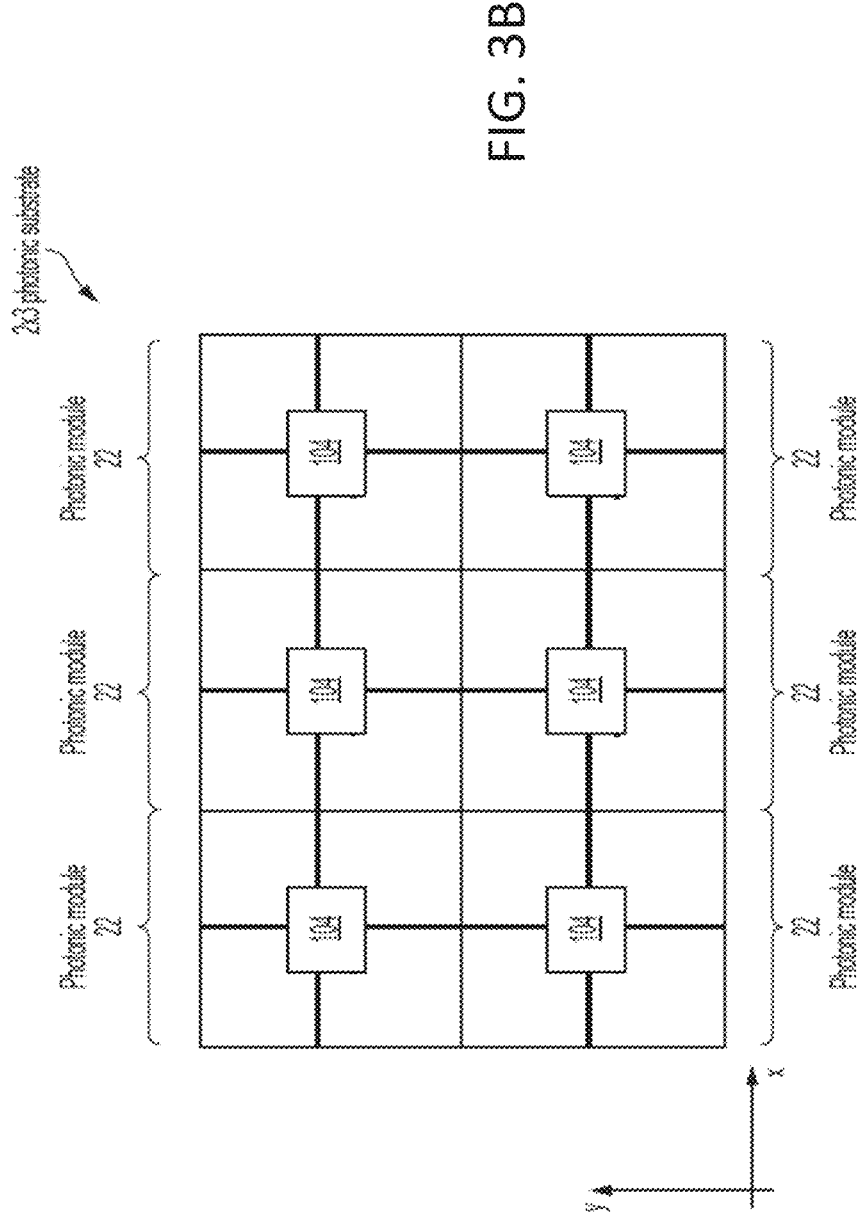
FIG. 3B illustrates a group of photonic modules of the type illustrated in FIG. 3A, in accordance with some embodiments.

A photonic substrate may include multiple photonic modules connected together to collectively form an optical network. FIG. 3B illustrates an example 2×3 photonic substrate including six photonic modules 22. This photonic substrate is obtained by dicing a group of 2×3 photonic modules off of wafer 100 (see FIG. 2E). The photonic modules 22 are arranged to that waveguide 111 of an optical module is aligned with waveguide 112 of the optical module to the left of that optical module, waveguide 112 of an optical module is aligned with waveguide 111 of the optical module to the right of that optical module, waveguide 113 of an optical module is aligned with waveguide 114 of the optical module above that optical module and waveguide 114 of an optical module is aligned with waveguide 113 of the optical module below that optical module. As a result, the optical modules form an optical network. Optical distribution networks 104 may route optical signals anywhere inside or outside the network. Suppose, for example, that a processor is mounted to the photonic module positioned at the north-west corner of the photonic substrate and that a memory is mounted to the photonic module positioned at the south-east corner of the photonic substrate. A read operation may involve reconfiguring the optical distribution networks (e.g., by controlling its optical switches) to place the processor in optical communication with the memory. For example, an optical communication path may be formed that 1) couples the processor to the out-of-plane coupler of the photonic module to which the processor is mounted, 2) couples the out-of-plane coupler of that photonic module to waveguide 112 of the same photonic module, 3) couples waveguide 112 of that photonic module to waveguide 111 of the adjacent photonic module (mid-uppermost photonic module), 4) couples waveguide 112 of the mid-uppermost photonic module to waveguide 111 of the next adjacent photonic module (north-east corner of the photonic substrate), 5) couples waveguide 114 of the photonic module positioned at north-east corner to waveguide 113 of the photonic module to which the memory is mounted, and 6) couples waveguide 113 of the photonic module to which the memory is mounted to the out-of-plane coupler of the same photonic module.

As discussed above, waveguides of adjacent photonic modules are optically coupled to one another, thereby permitting passage of light from one photonic module to the next. In some embodiments, the end of the waveguides may be physically connected. In other embodiments, there may be a gap between the waveguides. In this example, each waveguide has an end that is located at a distance from the boundary. Thus, a gap is formed at the boundary region. Notwithstanding the gap, the waveguides of the adjacent photonic module are still optically coupled to each other. In this case, in fact, light emitted at the end of a waveguide reaches the end of the other waveguide by free space propagation.

In some embodiments, photonic modules 22 may be patterned according to a common metal trace photomask. As a result, the photonic modules share the same pattern of metal traces. In some embodiments, photonic modules 22 are patterned according to multiple common photomasks. As a result, multiple levels of metal traces share the same patterns across different photonic modules. Some of the metal traces may be used to deliver power across a photonic substrate. For example, some of the metal traces may be arranged to form a power grid, as discussed in detail further below. FIG. 4 illustrates a 2×3 photonic substrate, in which each photonic module 22 shares the same pattern of metal traces. For the sake of illustration, only the metal traces are shown in this figure, though each photonic module further includes waveguides, one or more out-of-plane couplers and optical distribution networks. In this example, there are two levels of metal traces. The metal traces of each level has been fabricated using the same photomask across the different photonic modules. The metal traces of metal trace level 1 run in the horizontal direction, thereby electrically coupling photonic modules that are adjacent to one another in the horizontal direction. The metal traces of metal trace level 2 run in the vertical direction, thereby electrically coupling photonic modules that are adjacent to one another in the vertical direction. Of course, other arrangements are also possible. For example, in other embodiments, the metal traces of the same level may electrically couple one photonic module to all the photonic modules that are adjacent to it.

The metal traces are arranged to carry electricity (e.g., signals and/or power) across the boundaries of the photonic modules. This may be achieved by patterning metal traces to be continuous across the boundaries of the photonic modules. In this example, the metal traces of level 1 are continuous across the vertical boundaries, and the metal traces of level 2 are continuous across the horizontal boundaries. Metal traces of different levels may be connected to one another using vias. In some embodiments, the photonic modules may share the same patterns of vias. In other words, the same via photomask may be used for each photonic module. In some embodiments, the photonic modules may have more (tens to hundreds of) metal traces. Some of these metal traces may be arranged to be continuous across photonic modules but, in some embodiments, a majority of the metal traces need not be patterned to be continuous across modules.

IV. Photonic Redundancy

The manufacturing yield of the photonic modules described above may be less than 100%, meaning that some of the photonic modules may be defective. This can negatively impact the performance, and as a result, the scalability of the photonic communication platform. Considering for example the architecture of FIG. 3B, defects may occur in one of the optical distribution networks 104 and/or in one of the waveguides. An example of a defect in an optical distribution network is a region that is doped with the wrong level of doping. Another example is a contact that is only partially formed. Another example is a modulator that produces higher-than-acceptable insertion loss or lower-than-acceptable extinction ratio. Another example is a detector that turns out to be transmissive, instead of absorptive. An example of a defect in a waveguide in the creation of a corrugated region on the sidewall of the waveguide that leads to optical scattering. Another example is a local misalignment between two portions of a waveguide otherwise designed to be perfectly aligned with each other. This can lead to optical radiation outside the waveguide. Any one of these (and other) defects may impair the ability of the photonic communication platform to route light as desired.

Recognizing the reality of finite manufacturing yields, the inventors have developed a solution that circumvents defective optical components. The solution described herein relies on redundant optical lanes. A redundant optical line may be placed in parallel to a primary optical lane, and may be used in lieu of the primary optical lane where it is determined that the primary optical lane is defective. In some embodiments, a redundant optical may include optical components mirroring the optical components of the primary optical lane to which they run in parallel. Examples of components that may be part of an optical lane are waveguides, modulators, lasers, couplers, detectors, switches, isolators, lenses, polarizers, polarization rotators, multiplexers, demultiplexers, and any suitable combination thereof.

Figure 5A:
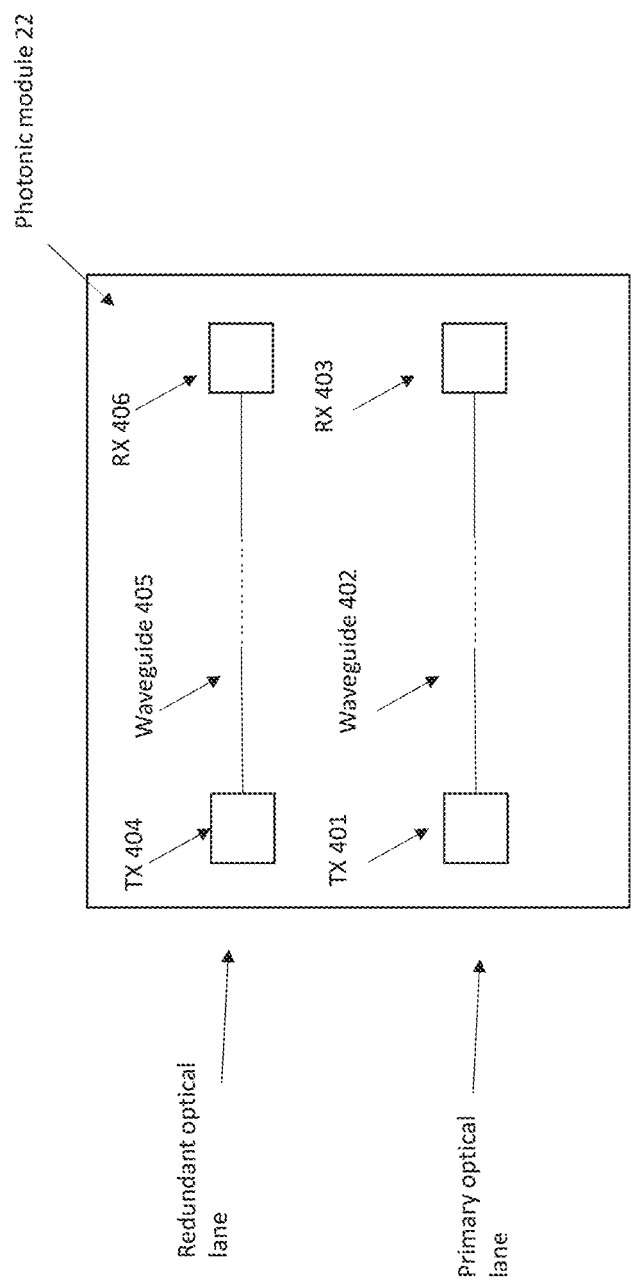
FIG. 5A illustrates a photonic module having a primary optical lane and a redundant optical lane, in accordance with some embodiments.

FIG. 5A illustrates an example of a redundant optical lane running in parallel to a primary optical lane. In this example, the primary optical lane includes a transmitter (TX) 401, a waveguide 402 and a receiver (RX) 403. TX 401 may include, for example, a modulator. RX 403 may include, for example, a detector. Waveguide 402 couples TX 401 to RX 403. The primary optical lane may be part of an optical distribution network 104 (see FIG. 3A). The redundant optical lane includes a TX 404, a waveguide 405 and an RX 406. TX 404 may mirror TX 401, waveguide 405 may mirror waveguide 402 and RX 406 may mirror RX 403. The redundant optical lane and the primary optical lane run in parallel to each other in that they are interchangeable—whether a signal is carried through the primary optical lane or the redundant optical lane does not affect the operation of the photonic module. It should be noted that in some embodiments there may be more than one redundant optical lane, to provide further redundancy.

In some embodiments, whether a primary optical lane is defective is determined as part of a post-manufacturing test procedure. If the procedure determines that the primary optical lane works properly, the photonic module may be set up so that signals pass through the primary optical lane. However, if the procedure determines that the primary optical lane does not work properly, the photonic module may be set up so that signals pass through the redundant optical lane. In some embodiments, the primary optical lane may be permanently disconnected if the procedure determines that the primary optical lane does not work properly (e.g., using an optical fuse).

Figure 5B:
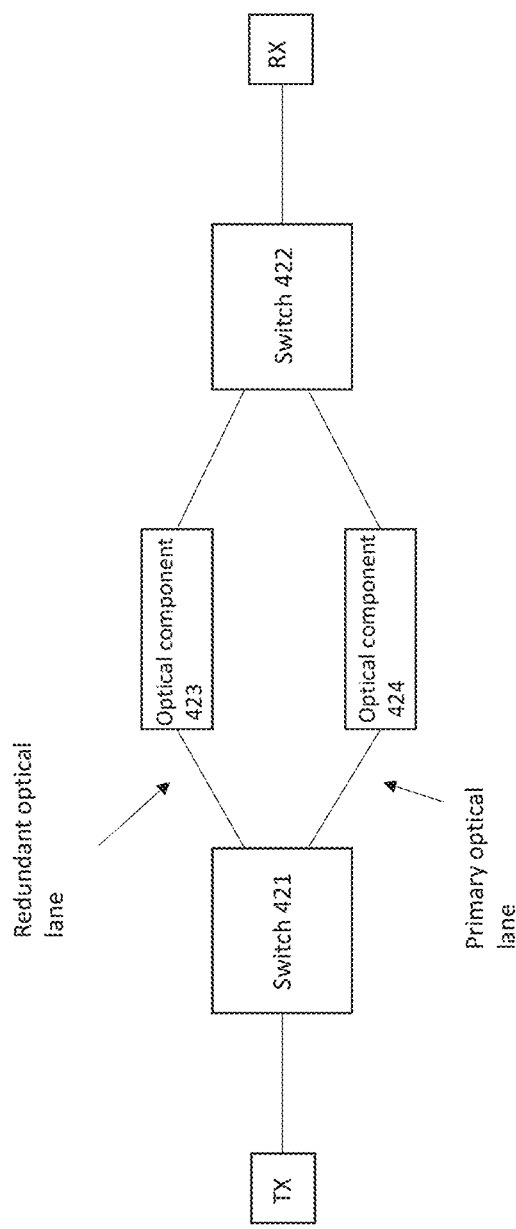
FIG. 5B illustrates a primary optical lane and a redundant optical lane connected to switches, in accordance with some embodiments.

Selection of one between a primary optical lane and a redundant optical lane may be performed using one or more optical switches. FIG. 5B illustrates one example. Here, a redundant optical lane including an optical component 423 is placed in parallel to a primary optical lane including optical component 424. An optical switch 421 is coupled to the respective inputs of the optical lanes. Switch 421 selects one between the input of the primary optical lane and the input of the redundant optical lane, depending on the outcome of the post-manufacturing test procedures described above. An optical switch 422 is coupled to the respective outputs of the optical lanes. Switch 422 selects one between the output of the primary optical lane and the output of the redundant optical lane, depending on the outcome of the post-manufacturing test procedures described above. In some embodiments, switches 421 and 422 work together in that they are configured to select the same switch, thereby creating an optical path from the TX to the RX either via the primary or the redundant optical lane.

Figure 5C:
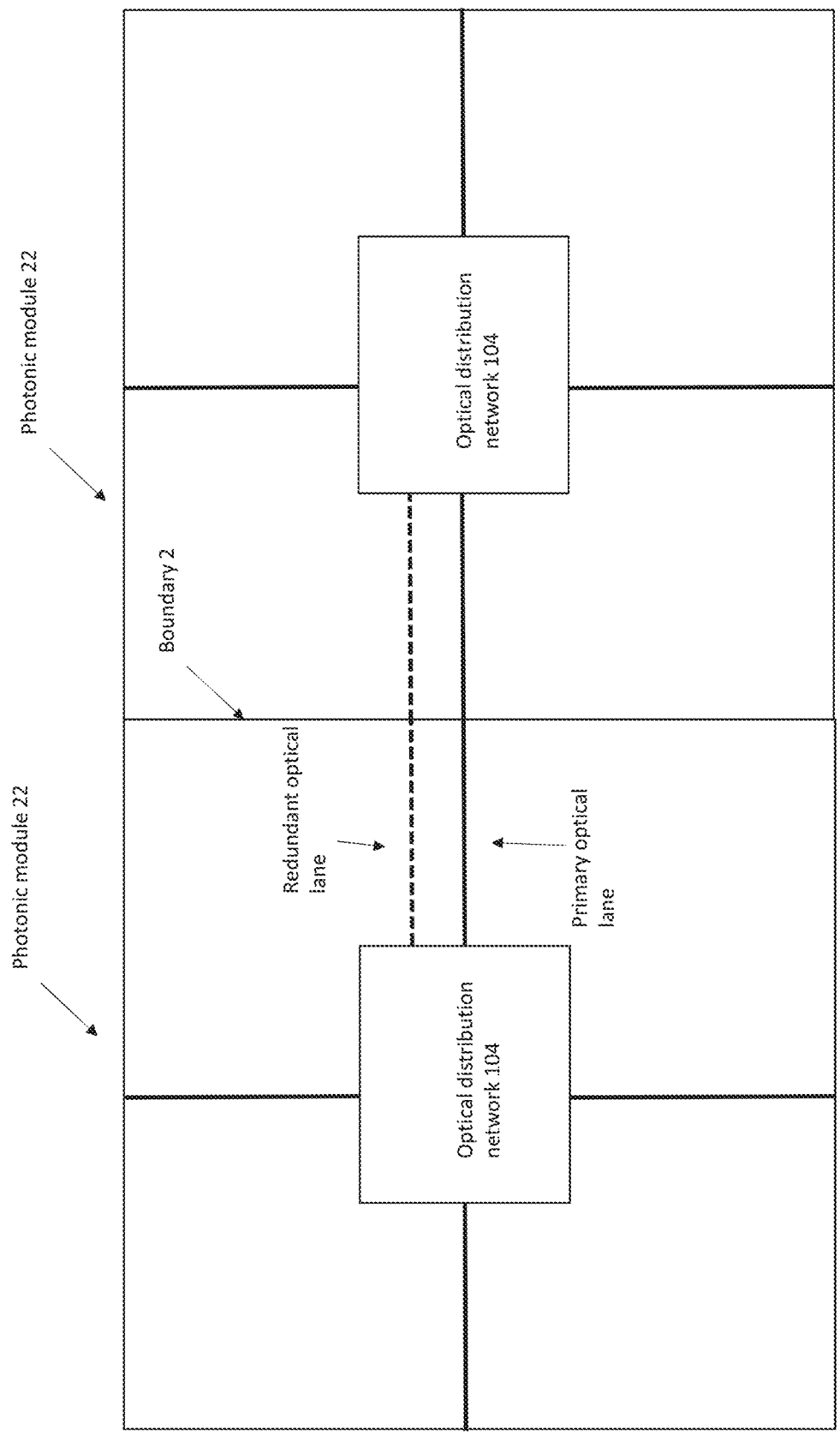
FIG. 5C illustrates a pair of adjacent photonic modules in optical communication with one another via a primary optical lane and a redundant optical lane, in accordance with some embodiments.

FIG. 5C illustrates a pair of adjacent photonic modules in optical communication with one another via a primary optical lane and a redundant optical lane. Selection of one between the primary optical lane and the redundant optical lane may be performed using one or more optical switches, for example as discussed in connection with FIG. 5B. Whether the primary optical lane or the redundant lane is selected depends on the outcome of the post-manufacturing test procedures described above. In some embodiments, there may be more than one redundant optical lane, to provide further redundancy. The scheme of FIG. 5C ensures that optical communication between different photonic modules is established notwithstanding the presence of defects owing to finite manufacturing yields.

V. Electronic Redundancy

In some embodiments, electronic redundancy may be introduced to reduce the negative effects of defects that impair the functionality of an electronic circuit of a photonic module. Examples of these circuits include electronic drivers for optical modulators and optical switches and transimpedance amplifiers for providing a voltage from a photocurrent. Electronic redundancy may be used in addition to or in alternative to photonic redundancy. Electronic redundancy may involve use of additional electronic circuits or wires running in parallel to primary electronic circuits or wires. This approach provides a way to work around defective circuits or wires, in a way similar to what is described above in connection with redundant optical lanes.

Figure 6B:
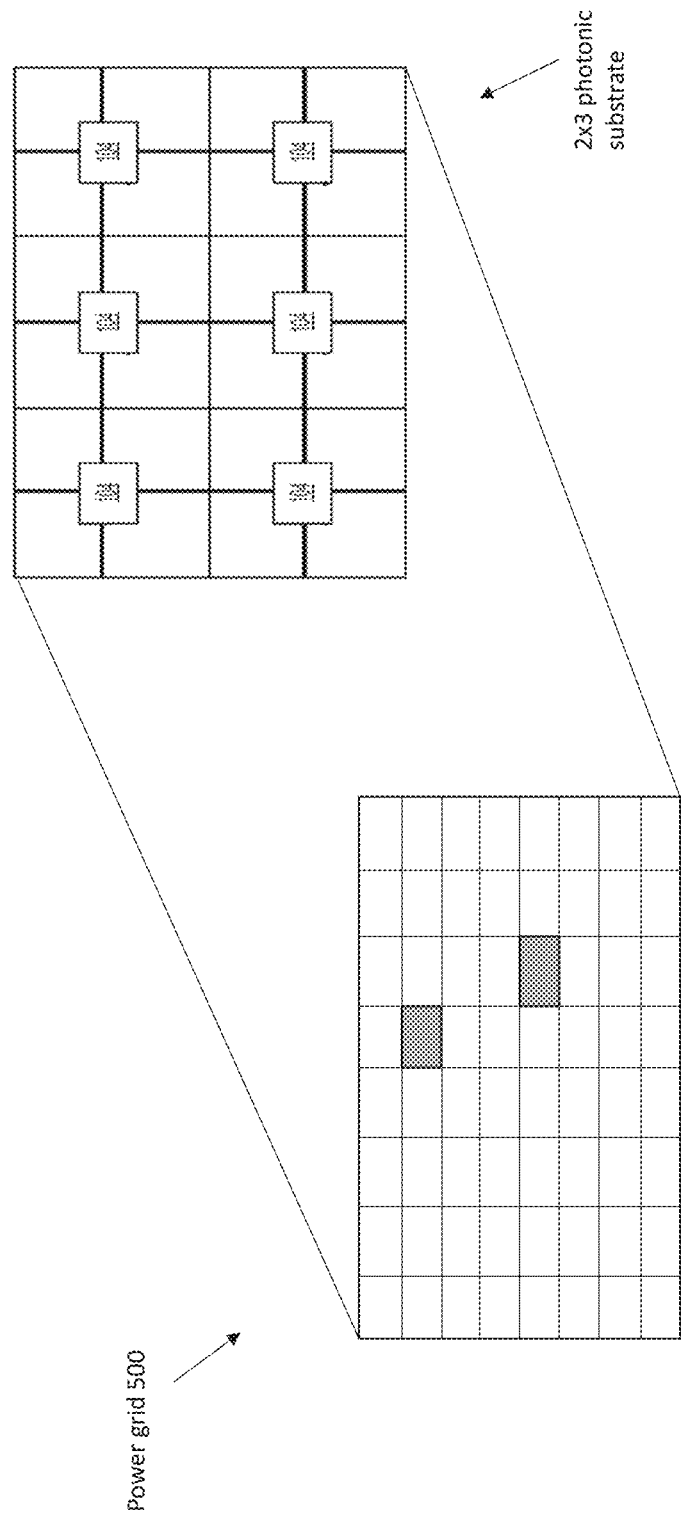
FIG. 6B illustrates a power grid overlaying a photonic substrate, in accordance with some embodiments.

In some embodiments, the defective circuits may be disabled to prevent negative impacts on other parts of the electronic system. This can be done by providing power-isolating switches that completely isolate the defective circuits from the rest of the system. Traditional semiconductor test technology can be used to identify defective chips and/or defective components within a chip. The inventors have appreciated that in some embodiments defective power supply or signal wiring could cause short circuits in the design. This would be fatal if all of the power supplies on the chip were stitched together across the entire wafer. In order to isolate short circuits, the power grid can be built with isolation switches. FIG. 6A is a schematic diagram of a power grid 500, in accordance with some embodiments. As shown in this depiction, the power grid in arranged in power islands 502, which can be disconnected from the rest of the grid if a defect is identified that could otherwise negatively effect the grid. In some embodiments, disconnection of an island may be performed using switches or other suitable electronic devices. Here, isolated power islands 504 are deemed defective and as a result have been disconnected from the grid. In the representation of FIG. 6B, a power grid 500 overlays a photonic substrate. For example, the power grid may include metal traces arranged in the manner described in connection with FIG. 4. The grid may be arranged so that each power island 502 powers the electronic circuits of a photonic module. Alternatively, the grid may be arranged so that mode than one power island 502 powers the electronic circuits of a photonic module, thereby providing redundancy should one of the power islands be defective.

VI. Fabrication

Figure 7:
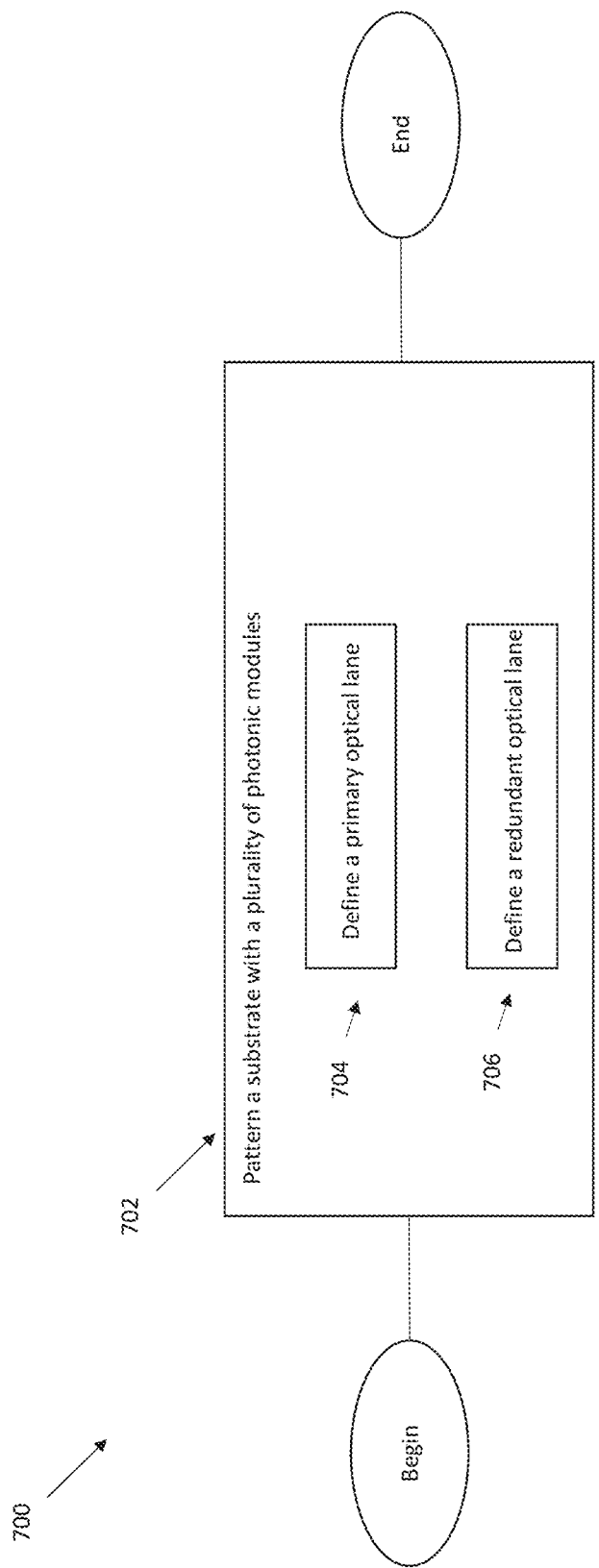
FIG. 7 is a flowchart illustrating a method for fabricating a photonic system, in accordance with some embodiments.

Some embodiments relate to methods for fabricating a photonic system. One representative fabrication method is depicted in FIG. 7, in accordance with some embodiments. Method 700 begins at step 702, in which a substrate is patterned with a plurality of photonic modules including at least first and second photonic modules. Step 702 may involve use of a stepper machine and a common photomask. In this way, the first and second photonic modules share a common layer pattern. Patterning the substrate may further involve involves defining a primary optical lane optically coupling the first photonic module to the second photonic module (sub-step 704), and defining a redundant optical lane optically coupling the first photonic module to the second photonic module (sub-step 706).

VII. Additional Comments

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic system comprising:
a photonic substrate patterned with a plurality of photonic modules including at least first and second photonic modules, wherein the first and second photonic modules are copies of a common template photonic module;
a primary optical lane optically coupling the first photonic module to the second photonic module across a first boundary between the first and second photonic modules;
a redundant optical lane, optically in parallel to the primary optical lane, optically coupling the first photonic module to the second photonic module across the first boundary between the first and second photonic modules;
a first optical switch coupled to respective inputs of the primary optical lane and the redundant optical lane; and
a controller configured to:
receive information indicative of whether the primary optical lane is defective, and
if the information indicates that the primary optical lane is defective, control the first optical switch to select the redundant optical lane and unselect the primary optical lane.

2. The photonic system of claim 1, further comprising a second optical switch coupled to respective outputs of the primary optical lane and the redundant optical lane.

3. The photonic system of claim 1, wherein the first optical switch is configured to irreversibly disconnect the primary optical lane or the redundant optical lane.

4. The photonic system of claim 1, wherein the first and second photonic modules share a common optical waveguide layer pattern.

5. The photonic system of claim 1, further comprising a first die in communication with the first photonic module, and a second die in communication with the second photonic module.

6. The photonic system of claim 5, wherein the first die comprises a processor and the second die comprises a memory.

7. The photonic system of claim 5, wherein the first die is stacked on top of the first photonic module and the second die is stacked on top or below the second photonic module.

8. The photonic system of claim 5, further comprising a third die stacked on top of the first die.

9. A photonic system comprising:
   a photonic substrate patterned with a plurality of photonic modules including at least first and second photonic modules, wherein the first and second photonic modules are copies of a common template photonic module;
   a power grid integrated with the photonic substrate and configured to electrically power at least some of the plurality of photonic modules, the power grid being arranged in a plurality of power islands that can be electronically isolated from the power grid; and
   a controller configured to:
      determine whether a first power island of the plurality of power islands is defective; and
      control a first power isolating switch to electronically isolate the first power island from the power grid if the first power island is determined to be defective.

10. The photonic system of claim 9, wherein the power grid comprises a first metal trace level of the photonic substrate and a second metal trace level of the photonic substrate.

11. The photonic system of claim 9, further comprising a plurality of power isolating switches configured to electronically isolate one or more power islands from the power grid.

12. The photonic system of claim 9, further comprising a primary wiring electrically coupling the first photonic module to the second photonic module, and a redundant wiring electrically coupling the first photonic module to the second photonic module.

13. The photonic system of claim 9, further comprising a primary optical lane optically coupling the first photonic module to the second photonic module, and a redundant optical lane optically coupling the first photonic module to the second photonic module.

* * * * *